United States Patent
Sweeting

(10) Patent No.: US 9,884,388 B2
(45) Date of Patent: Feb. 6, 2018

(54) FRICTION WELDING VIBRATION DAMPING

(71) Applicant: ROLLS-ROYCE plc, London (GB)

(72) Inventor: Tony Jason Sweeting, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/063,830

(22) Filed: Mar. 8, 2016

(65) Prior Publication Data

US 2016/0288247 A1    Oct. 6, 2016

(30) Foreign Application Priority Data

Apr. 1, 2015 (GB) .................................. 1505631.0

(51) Int. Cl.
  *B23K 20/12* (2006.01)
  *B23K 37/04* (2006.01)
  *B23K 20/26* (2006.01)

(52) U.S. Cl.
  CPC .............. *B23K 20/12* (2013.01); *B23K 20/26* (2013.01); *B23K 37/04* (2013.01)

(58) Field of Classification Search
  CPC . B23K 20/12–20/1215; B23K 20/1285; B23K 20/129; B23K 37/04
  USPC .... 228/2.1–2.3, 112.1–114.5, 44.3; 156/73.5
  See application file for complete search history.

(56) References Cited

U.S. PATENT DOCUMENTS

| | | | | |
|---|---|---|---|---|
| 3,269,003 A | * | 8/1966 | Hollander | B23K 20/12 228/114.5 |
| 3,412,916 A | * | 11/1968 | Dunlap | B23K 20/12 228/2.3 |
| 3,541,669 A | * | 11/1970 | Yocum | B23K 20/121 156/73.5 |
| 3,799,007 A | * | 3/1974 | Keller | B23K 9/028 74/815 |
| 3,838,807 A | * | 10/1974 | Nomura | B23K 20/12 220/23.8 |
| 3,877,629 A | | 4/1975 | Louw et al. | |
| 4,075,820 A | * | 2/1978 | Standley | B29C 65/0672 156/580.1 |
| 4,247,346 A | * | 1/1981 | Maehara | B23K 20/1205 156/157 |

(Continued)

FOREIGN PATENT DOCUMENTS

| | | | | |
|---|---|---|---|---|
| DE | 102010026083 | * | 1/2012 | ........... B23K 20/121 |
| WO | WO 2009018804 A2 | * | 2/2009 | ............. B23K 20/12 |

OTHER PUBLICATIONS

Jul. 25, 2016 Search Report issued in European Patent Application No. 16159004.7.

(Continued)

*Primary Examiner* — Kiley Stoner
(74) *Attorney, Agent, or Firm* — Oliff PLC

(57) ABSTRACT

A friction welding tool having a main body and a first clamp for gripping a first weld component and a second clamp for gripping a second weld component, at least one of the clamps being movable with respect to the other to effect friction welding of the respective weld components. The friction welding tool includes a vibration damper arrangeable to absorb vibrations of the first weld component during the friction welding. The friction welding tool includes an anchor element arranged to couple the damper to the main body of the friction welding tool to transfer absorbed vibrations to the main body.

14 Claims, 1 Drawing Sheet

(56) References Cited

U.S. PATENT DOCUMENTS

| | | | | |
|---|---|---|---|---|
| 5,188,275 | A * | 2/1993 | Daines | B23K 20/1205 |
| | | | | 228/2.1 |
| 5,466,316 | A * | 11/1995 | Hardigg | B29C 66/3262 |
| | | | | 156/308.4 |
| 5,538,173 | A | 7/1996 | Hummel | |
| 7,637,300 | B2 * | 12/2009 | Kimura | B29C 65/0618 |
| | | | | 156/580 |
| 8,756,790 | B2 * | 6/2014 | Clinch | B29C 66/43421 |
| | | | | 156/298 |
| 9,597,748 | B2 * | 3/2017 | Lardy | B23K 20/129 |
| 2004/0108358 | A1 * | 6/2004 | Carrier | B23K 20/12 |
| | | | | 228/2.1 |
| 2006/0051211 | A1 | 3/2006 | Ferte et al. | |
| 2007/0272728 | A1 * | 11/2007 | Dzialas | B23K 20/12 |
| | | | | 228/114.5 |
| 2010/0038404 | A1 * | 2/2010 | Lingnau | B23K 13/015 |
| | | | | 228/2.1 |
| 2010/0163601 | A1 * | 7/2010 | Grooms | B23K 20/121 |
| | | | | 228/102 |
| 2010/0193572 | A1 | 8/2010 | Bayer et al. | |
| 2012/0280485 | A1 * | 11/2012 | Stol | B23K 20/233 |
| | | | | 285/21.1 |

OTHER PUBLICATIONS

Jan. 15, 2016 Search Report issued in British Patent Application No. 1505631.0.

* cited by examiner

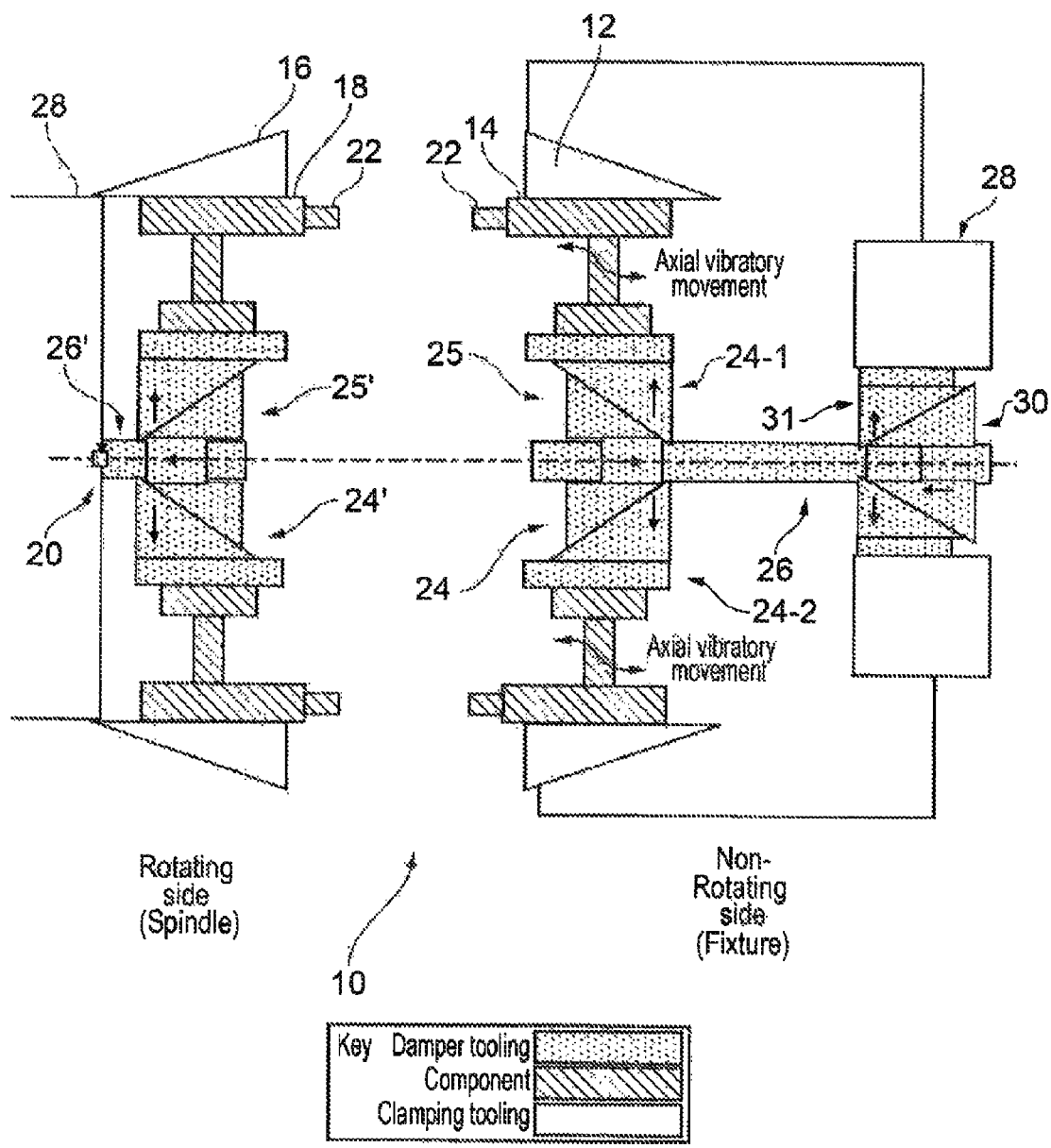

FRICTION WELDING VIBRATION DAMPING

CROSS-REFERENCE TO RELATED APPLICATIONS

This application is based upon and claims the benefit of priority from British Patent Application Number 1505631.0 filed 1 Apr. 2015, the entire contents of which are incorporated by reference.

BACKGROUND

1. Field of the Disclosure

The present disclosure relates generally to friction welding, for example inertia welding, for example to a vibration damper for regulating component vibration during friction welding or inertia welding.

2. Description of the Related Art

Inertia welding is a process in which one component is rotated about an axis and brought in contact with a second component. Frictional forces between the components heat up the interface between the components sufficiently that the components melt and a weld is produced at the interface. Depending on the geometry of the components, the friction between the components can also induce vibrations in the components.

For example, when components of a product are inertia welded together, each component may be clamped at its respective rim to an inertia welding machine. One component is rotated about an axis of rotation and brought in to contact with the other component. As the components are inertia welded, the components may axially deflect with respect to the axis of rotation. This deflection causes inconsistent vibration(s).

Vibrations can cause the weld integrity to be unacceptable from dimensional loss in length and/or rate of loss in length outside of validated understanding.

US2010/0193572 discloses a free standing vibration damper which allegedly improves the welded seam qualities of the welded components. US2004/0108358 discloses a damper which allegedly reduces vibration in at least a portion of a component during inertia welding.

However, the present inventor has appreciated that the vibrations can vary significantly from weld to weld, even though the respective welds and the component portions used in the welds are ostensibly identical and are intended to result in ostensibly identical welded products. The variation in vibrations between the welds can result in unwanted variation in the quality of the resulting welded joint produced by the welds. Such variations may occur during the initial contact of the two parts being welded, for example during the period in which the interface is not molten, or is only partially molten. Therefore, the present inventor has appreciated that the variation in the vibrations experienced from weld to weld has a limiting effect on the reproducibility of welded products which are desired to be identical.

OBJECTS AND SUMMARY

Accordingly, the present disclosure provides a friction welding tool as set forth in claim 1.

Thus, the damper and anchor element may combine to transfer vibrations from the weld component to the main body of the friction weld tool. In this way, rather than merely reducing the vibrations generated during any single welding operation, the present disclosure is able to regulate, or standardize, the vibrations generated in each welding operation over a series of welding operations. For example, the vibrations experienced when friction welding a pair of components to form a particular welded product can be controlled to be similar to the vibrations experienced when repeating the same friction weld process for an ostensibly identical pair of components to form a desirably identical welded product. In essence, the welds in the respective products can be made more similar, and are more "standardized", and thus the structural characteristics of the respective products are more uniform.

Furthermore, anchoring the damper to the main body of the inertia weld tool (by the anchor element) also enables a greater reduction of the axial flexing movement of the weld component during friction welding, e.g. inertia welding, which can be one of the main causes of the vibration.

The damper may be arrangeable such that the first respective weld component is mountable thereon.

The first weld component may include a hollow body. The first clamp may be arrangeable to grip the first weld component by at least a portion of an outer surface of the body. The damper may be dimensioned to be arrangeable within the hollow in tight fitting engagement with at least a portion of an inner surface of the body.

The dimensions of the damper may be variable to allow modification of the tight fitting engagement of the damper with the at least a portion of the inner surface.

The damper may include a damper body and an outer sheath for engagement with at least a portion of the inner surface of the first weld component.

The damper body may be formed of a plastic, and/or the sheath may be formed of rubber.

The first clamp and the vibration damper may be configured to cooperate to grip radially therebetween the first weld component.

The anchor element may be arranged to be under tension between the damper and the main body.

The anchor element may be coupled to the main body and to the damper via respective attachment means, wherein at least one of the attachment means is adjustable to vary the tension in the anchor element. The anchor element may be attached to the main body, for example detachably attached.

The anchor element may be detachably attached to the damper.

The anchor element may be formed of metal.

The second clamp may be rotatable relative to the first clamp.

A further damper may be arrangeable to absorb vibrations of the second weld component during the friction welding; and preferably a further anchor element is arranged to couple the further damper to the main body of the friction welding tool to transfer the absorbed vibrations to the main body.

The main body may include a rotatable spindle for rotating the second clamp, and the further anchor couples the further damper to the spindle.

The friction welding tool may be an inertia welding tool.

The present disclosure also provides a method of friction welding using a friction welding tool having a main body, including the steps of: arranging a first clamp to grip a first weld component and arranging a second clamp to grip a second weld component; arranging a vibration damper to absorb vibrations of the first weld component during subsequent friction welding; arranging an anchor element to couple the damper to the main body of the friction welding tool to transfer vibrations absorbed by the damper to the main body; and performing the friction welding by moving at least one of the clamps with respect to the other to effect friction welding of the respective weld components.

The step of performing the friction welding may include the step of rotating the second clamp relative to the first clamp.

The method may further include the steps of: arranging a further damper to absorb vibrations of the second weld component during subsequent friction welding; and arranging a further anchor element to couple the further damper to the main body of the friction welding tool to transfer the absorbed vibrations to the main body.

The main body may include a rotatable spindle for rotating the second clamp, and the further anchor may couple the damper to the spindle.

The friction welding tool may be an inertia welding tool, and the method may be a method of inertia welding.

The present disclosure is applicable to friction welding, such as rotary friction welding and linear friction welding. The present disclosure is particularly applicable to inertia welding, for example rotary inertia welding.

Although the present disclosure is described herein with reference to friction welding, in particular inertia welding, the present disclosure is also useable in lathe/milling vibration reduction when components are cut and machine/tooling/component/cutting tool vibration causes issues with surface finish and/or dimensional consistency and accuracy.

Accordingly, the present disclosure provides in an aspect a vibration damping assembly for a machining tool having a clamp and a main body, the vibration damping assembly including: a vibration damper arrangeable to absorb vibrations of a first work component (work piece) gripped by the clamp during working of the work component by the machining tool; and an anchor element arrangeable to couple the damper to the main body of the machining tool to transfer absorbed vibrations to the main body.

The machining tool may be a lathe. The clamp may be provided on a rotatable spindle. The anchor may be attached to the spindle.

The machining tool may be a milling machine. The milling machine may include a spindle rotatable relative to the clamp; the spindle may be adapted to receive milling tools for machining the work component.

Working the work component may include lathing, machining (by milling), or inertia welding for example.

Accordingly, the present disclosure provides in another aspect a tooling machine (e.g. a lathe or milling machine) having a clamp, a main body, and a vibration damping assembly including: a vibration damper arrangeable to absorb vibrations of a first work component (work piece) gripped by the clamp during working of the work component by the machining tool; and an anchor element arrangeable to couple the damper to the main body of the machining tool to transfer absorbed vibrations to the main body.

Any feature described herein may be included in any aspect or embodiment disclosed herein, unless the inclusion is expressly forbidden or unless the skilled person would understand the inclusion to be technically impossible.

BRIEF DESCRIPTION OF THE DRAWINGS

Embodiments of the disclosure will now be described by way of example with reference to the accompanying drawings in which:

FIG. 1 shows an inertia welding apparatus arranged according to an aspect of the present disclosure.

DETAILED DESCRIPTION OF EMBODIMENTS

In friction welding, an example of which is inertia welding such as rotary inertia welding, a structural part is welded to a second structural part by plasticizing the interface between the two parts. The heat needed to plasticize the material at the interface of the parts is typically provided by friction between the interface surfaces of the two parts. Usually one of the structural parts is clamped to a rotary spindle of a welding tool, placed in a rotating motion, and moved onto the second structural part by applying an axial force. The second structural part is typically held stationary (for example it may be clamped to a stationary spindle) and thereby secured against torsion applied by the rotating part.

FIG. 1 shows a schematic of a friction welding apparatus, in particular an inertia welding apparatus, arranged according to an embodiment of the present.

The hatched elements of the schematic represent an example of weld components to which the present disclosure is applicable. The example shown demonstrates the formation of welded parts for a High Pressure Compressor stage in a gas turbine jet engine. However, the present disclosure could be used on any tubular type components that are affected by vibration from the welding process itself.

The dotted elements of the schematic represent features according to one or more aspects of the present disclosure, and may be said to represent damper tooling.

The white (non-hatched and non-dotted) elements of the schematic represent features of an inertia welding tool at least some of which may be common with conventional inertia welding tools, and may be said to represent clamping tooling.

The inertia welding tool 10 includes a clamp 12 for gripping weld component 14. Clamp 12 may be a chuck or collet clamp for example. Thus clamp 12 is typically a clamp suitable for gripping a weld component having radial symmetry, e.g. a generally cylindrical outer surface. For example, clamp 12 is typically arrangeable around the weld component to apply a radially inward gripping force to the weld component. The clamp 12 may be arrangeable concentrically around the weld component for example. The clamp 12 may have an axis of rotational symmetry, for example indicated by the dashed line in FIG. 1. The weld body (or at least a portion thereof) may also have an axis of rotational symmetry, for example indicated by the dashed line in FIG. 1. The respective axes of rotational symmetry are preferably arranged co-axially.

The inertia welding tool 10 includes another clamp 16 for gripping another weld component 18. Clamp 16 may be a chuck or collet clamp for example. Thus clamp 16 is typically a clamp suitable for gripping a weld component having radial symmetry, e.g. a generally cylindrical outer surface. Clamp 16 is therefore typically arrangeable concentrically around the weld component to apply a radially inward gripping force to the weld component. The clamp 16 may have an axis of rotational symmetry, for example indicated by the dashed line in FIG. 1. The weld body (or at least a portion thereof) may have an axis of rotational symmetry, for example indicated by the dashed line in FIG. 1. The respective axes of rotational symmetry are preferably arranged co-axially.

Each clamp may be provided as a generally circumferential clamp, arranged to be capable of gripping, radially, the respective weld component.

Clamp 16 is coupled to a rotatable spindle 20. Therefore, when gripped by clamp 16, weld component 18 is rotatable about an axis of rotation. The axis of rotation of weld component 18 (and clamp 16) is preferably co-axial with their respective axes of rotational symmetry.

Clamp 12 is preferably static, such that weld component 14 is not rotatable. Weld component 18 is thus rotatable relative to weld component 16. The respective axes of rotational symmetry of weld components 14 and 18 are preferably arranged co-axially.

Rotation of weld component 18 and relative axial movement of the respective weld components towards each other allows the formation of the interface mentioned above, and the plasticization of the surfaces forming the interface, thereby forming the weld joint.

Typically, clamp 16 is movable axially with respect to clamp 12 so as to engage rotating weld component 18 with static weld component 14. Nevertheless, additionally or alternatively, clamp 12 may be movable axially with respect to clamp 16 to allow engagement of the respective weld components.

Both of the components 14 and 18 will typically include stubs 22 to help facilitate the weld joint. For example, the stubs 22 may help to expedite the plasticization of the interface formed between the weld components. The weld stubs are typically pre-validated for a set calculated length and geometry (thickness) for the nominal upset (loss in length) in the resulting welded product.

Despite the provision of stubs 22, a brief period (for example 0.5 seconds or so) after initial contact of the weld components is critical to the weld, because during this period the interface is not molten (e.g. plasticized), and vibrations are generated in the respective weld components.

Even without changing weld process parameters (and even when using ostensibly identical weld components), these vibrations (and subsequent vibrations) can vary between "welding runs" (i.e. welding operations resulting in the welded product). This variation can result in some unacceptable welds, which can result in the components having to be scrapped. For example, the vibrations may affect differently the weld integrity in respective (but desirably identical) welded products. Also, welded products resulting from different weld operations may vary slightly in length due to variations in the amount of weld energy being dissipated as vibrations during the weld operations. This is a particular problem in inertia welding, where typically the characteristics of the final weld joint are determined by the starting conditions of the weld process. In inertia welding the rotary side of the inertia welding tool often includes a flywheel of a known mass. The rotary side is spun up to a predetermined rotational speed, effectively to store the required energy in the rotation of the flywheel (and the associated weld component). When the rotary side has achieved the desired rotational speed, the driving motor is typically disengaged and the respective weld components are brought together to plasticize the interface between them and thus weld them together.

So, in essence, the amount of energy available for the weld joint to be produced is predetermined by the angular momentum stored in the rotating flywheel (and weld component, chuck etc). Therefore, to be able to reproduce highly similar weld joints time after time in inertia welding, the energy available to form the weld joint itself needs to be standardized so that each weld joint is formed using (as far as possible) the same amount of energy. However, the present inventor has realized that vibrations remove energy from the system, thereby affecting the reproducibility of the weld joints.

The present disclosure therefore provides a means to regulate or normalize the vibrations experienced when producing a series of (desirably identical) welded products. Accordingly, the present disclosure provides a means to regulate or standardize the weld joints of respective welded products resulting from different weld operations. In other words, the present disclosure provides the ability to reproduce (ostensibly identical) welded products having more similar welded joints than is possible in the prior art.

Accordingly, in embodiments, a vibration damper 24 is provided anchored, via anchor element 26, to a component or portion of the main body 28 of the inertia welding tool 10.

The damper 24 is arranged to absorb vibrations, for example axial vibrations, from the weld component. The damper is arranged to be engaged physically with the weld component for example. Where the weld component has an internal bore, the damper 24 is preferably arranged in the internal bore of the respective weld component. For example, the damper 24 is preferably put into tight fitting engagement with the inner surface of the weld component defining the bore.

To achieve the tight fitting engagement, the size of the damper may be adjustable. For example, the damper may be adjustable to vary the extent of radial projection of the damper, so as to be able to adjust the tightness of fit of the damper within the bore. In particular, the damper may be an expandable mandrel.

The damper 24 may include a damper body 24-1, which is preferably formed of plastic. The damper 24 may include a sheath element 24-2, extending circumferentially at least partway around the damper body 24-1. The sheath element 24-2 may be formed of a conformable material, such as rubber, to conform to the inner surface of the weld component 14 for example.

The damper 24 is anchored to the main body 28 of the inertia welding tool 10 by anchor element 26. Anchor element 26 may be attached to the main body 28 via a damper 31; damper 31 may be provided in a similar form to damper 24 as described herein. Damper 31 is thus preferably locatable in a bore hole provided by the welding tool main body 28. Anchor element 26 may be attached to damper 31 via attachment means 30. Attachment means 30 may be provided in a similar form to attachment means 25 as described herein.

Nevertheless, anchor element 26 effectively couples the damper 24 to the main body 28.

Anchor element 26 is attached to damper 24 by attachment means 25. Attachment means 25 is preferably adjustable, for example to adjust the tightness of fit of the damper within the bore. For example, anchor element 26 may be fixed to damper 24 using attachment means 25 which includes a rotatable nut arrangement that allows for expanding or loosening of the diameter of the damper 24, to allow adjustment of the tightness of fit of the damper within the bore.

The damper 24 is thus preferably arranged such that adjustment of the attachment means 25 modifies the tightness of fit of the damper 24 within the bore of the weld component 14. In other words, adjusting the attachment means 25 results in radial expansion or contraction of the damper 24 within the bore, depending on the nature of the adjustment.

For example, attachment means 25 coupling the damper 24 and the anchor element 26 may include a chamfered surface for cooperating with a correspondingly chamfered surface provided by the damper 24, such that movement of the attachment means 25 in a first direction parallel to the long axis of the anchor element 26 causes the damper 24 to expand in size (to increase the tightness of fit of the damper within the bore); whereas movement of the attachment means 25 in a second direction parallel to the long axis of the anchor element 26 (e.g. opposite to the first direction) causes the damper 24 to contract in size (to decrease the tightness of fit of the damper within the bore). The attachment means may include a threaded nut for engagement with a portion of the anchor element which includes a complementary thread for engagement by the thread of the nut. Rotation of the nut moves the nut along the anchor element, to facilitate movement of the attachment means 25 and thus expansion/contraction of the (diametric) size of the damper 24.

The anchor element 26 and the damper 24 are arranged such that adjusting the attachment means 25 (e.g. by applying torque to the nut to rotate it and thus move it along the anchor element for example) may allow the combined vibration damping properties of at least the damper 24 and anchor element 26 to be optimized.

Preferably, the anchor element 26 is formed of metal.

Anchor element 26 may be provided in the form of a shaft.

The anchor element 26 is preferably placed under tension between the damper 24 and the main body 28; for example between the arrangement of the damper 24 and attachment means 25 and the arrangement of the damper 31 and the attachment means 30. Adjusting the tension of the anchor element 26 helps to optimize the vibration damping properties of at least the damper 24 and the anchor element 26. Adjusting the attachment means 25 and/or 30 preferably results in adjustment of the tension.

By rigidly coupling the damper 24 to the main body 28 of the inertia welding tool 10 by the anchor element 26, vibrations generated in the weld component 14 can be transferred via the damper 24 to the main body 28. Accordingly, the present disclosure reduces the variation in respective inertia welding runs producing respective welded products by reducing the variation in the vibrations experienced during the respective welding runs, in particular at initial contact of the weld components.

Furthermore, by providing a tight fit between the damper 24 and weld component 14, axial vibratory movement of the weld component can also be reduced. This is particularly advantageous when the weld component includes a relatively thin member, such as a tyne or flange, projecting generally radially inwards from a radially outer portion of the weld component. Such members may easily be caused to vibrate axially by the inertia welding operation resulting in the problems discussed herein. Providing the tight fitting damper 24 helps to reduce such axial vibrations.

However, whilst the magnitude of the vibrations (e.g. axial vibrations) may be reduced by the damping arrangement of damper 24 and anchor element 26, it is the reduction in the variation of the vibrations between respective (inertia) welding runs that is a principle benefit offered by the present disclosure. Once the variation is reduced then other parameters (such as the length of stubs 22, energy input etc) can be set to provide consistent and desired welds over a series of respective inertia weld runs.

It is believed that the optimum benefit provided by the present disclosure is achieved when the damping arrangement (damper 24 and anchor element 26) is provided for the static weld component 14, i.e. on the static side of the weld tool comprising clamp 12. The static side of the weld tool may be referred to as the fixture.

However, a benefit is also seen when a damper 24' and anchor element 26' is provided for the rotatable weld component 18, i.e. on the rotatable or rotary side of the weld tool comprising clamp 16. The rotary side of the weld tool includes the rotatable spindle 20. In view of the mass, and the way in which it is integrated into the inertia weld tool, the rotatable spindle 20 can be thought of as forming a portion of the main body 28 of the inertia weld tool 10.

Therefore, in another embodiment, in addition to (or as an alternative to) providing the static side of the weld tool with the damping arrangement of damper 24 and anchor element 26, the rotary side of the weld tool may be provided with a damper 24', an attachment means 25' and an anchor element 26'.

Damper 24' is similar to damper 24, and therefore is arrangeable in a bore provided by weld component 18 in the same way as damper 24 is arrangeable in the bore provided by weld component 14.

Anchor element 26' is similar to anchor element 26. Anchor element 26' may be attached to damper 24' via attachment means 25' in the same way as anchor element 26 is attached to damper 24 via attachment 25.

However, anchor element 26' is attached to spindle 20 to couple damper 24' to spindle 20 (which forms a portion of the main body 28 of the weld tool). Anchor element 26' is attached to spindle 20 so as to rotate therewith.

An example of how to use an embodiment of the present disclosure in rotary inertia welding will now be given, although the present disclosure is applicable to a broader range of welding friction welding techniques. In the example embodiment, a damping arrangement is provided on the static (fixture) side only.

The weld component assembly is loaded into the inertia welding tool, for example by clamping the weld components with the respective clamps.

The damping assembly 31 may already be in place in the weld tool, for example attached to the main body of the tooling bore by attachment means 30, so as to provide the damping assembly 31 in the form of an expanding mandrel. However, the method may include the step of installing in the weld tool (before or after the weld component assembly is loaded into the tool), by attaching the damping assembly 31 to the main body 28 of the weld tool 10. In any event, the method may include the step of adjusting the attachment means 30 to expand the damping assembly 31 within the tooling bore thereby to secure the attachment of the damping assembly to the main body 28 of weld tool 10.

The damper 24, of the damping assembly, is preferably located in a void, bore or hollow provided by the weld component clamped on the fixture side of the weld tool 10. The damper 24 is preferably adjusted to engage a region of the weld component that is expected to experience the most axial movement (axial vibration) during the subsequent inertia welding. For example, the damper 24 is adjusted by expanding it radially to engage with the weld component, preferably by being put into tight fitting engagement with the weld component. Suitable radial expansion of the damper 24 can be achieved by suitable adjustment of the attachment means, for example.

The present disclosure is particularly suited for use with a weld component in the form of an axially extending annulus, for example a generally cylindrical body or a tubular structure. The damper 24 and the clamp 12 may cooperate to place the weld component under radial compression, as the damper 24 is provided within the bore of the weld component to engage a portion of the radially inner surface of the weld component, while the clamp is provided radially outwards of the weld component to grip a portion of the radially outer surface of the weld component.

In this way the damper 24 is coupled to the main body 28 of the weld tool by the anchor element 26 of the damping assembly.

Attachment means 25 and/or 30 may be adjusted to alter the vibration coupling characteristics of the path between the damper 24 and tooling main body 28. The coupling characteristics include the tension, e.g. axial tension, which the anchor element is under. As mentioned, adjusting the attachment means 25 preferably results in a corresponding adjustment of the (axial) tension under which the anchor element 26 is held. Therefore, the present disclosure may include the step of putting the anchor element under tension, e.g. axial tension, and/or adjusting the tension thereof.

The coupling characteristics may be adjusted to tune the damping assembly to better absorb the expected vibrations, for example based on previous empirical results and/or mathematical modelling.

Subsequently, a welding operation can be performed such that the weld components are friction (e.g. inertia) welded to each other.

A similar procedure can be followed for a damping assembly 24' provided on the rotating side of the weld tool, where a damping assembly 24' is additionally or alternatively provided there. However, for the rotating side, it is expected that the anchor element 26' would be attached to the spindle 20 not by an expandable arrangement such as that provided by damping assembly 31 and attachment means 30, but by a simpler direct attachment means such as a nut for example.

Nevertheless, it is expected that the damper 24' on the rotating side would be brought into tight fitting engagement with at least a portion of the inner surface of the weld component 18 in a similar way. And, it is expected that the anchor element 26' would be put under tension, e.g. axial tension, in a similar way to that described above. For example, as described above, the coupling characteristics on the rotating side may be adjusted to tune the damping assembly on the rotating side to better absorb the expected vibrations.

Any friction welding application (including any inertia welding application) could have the damping assembly according to the present disclosure applied to it.

Advantageously, in addition to removing much of the inconsistency between weld runs, and removing the inconsistency in energy used during respective weld runs, the present disclosure has been found to help reduce secondary welding to tooling.

A key difference between the present disclosure and the prior art is the feature of 'anchoring' of the damping assembly to the main (solid) body of the friction (e.g. inertia) welding tool. The securing of the damping assembly into the main body (usually in the region of the weld tool that is used to oppose the axial force of the weld operation itself), enables the damping tooling to transfer the vibration away from the welding part(s) to the main bulk of the machine (weld tool). This therefore dissipates the vibration away from the weld area.

As already discussed, although the present disclosure locally reduces vibration it also transfers it to the main body of the machine, where it will dissipate. The device can also be targeted at the most sensitive areas for vibration in any specific part geometry. These features not only aid the reduction in local secondary welding (part to tooling) but facilitate to keep the energy loss through vibration to a more consistent level, meaning that the effect of the vibrations on welds resulting from different weld operations can be regulated and can be made more consistent. The quality of the welds in respective (ostensibly identical) welded products can be made more consistent.

I claim:

1. A friction welding tool having a main body and:
a first clamp for gripping a first weld component and a second clamp for gripping a second weld component, at least one of the clamps being movable with respect to the other to effect friction welding of the respective weld components;
a vibration damper arranged to absorb vibrations of the first weld component during the friction welding; and
an anchor element arranged to couple the damper to the main body of the friction welding tool to transfer absorbed vibrations to the main body, wherein the anchor element is arranged to be under tension between the damper and the main body.

2. The friction welding tool according to claim 1, wherein the damper is arranged such that the first respective weld component is mountable thereon.

3. The friction welding tool according to claim 1, wherein the first weld component includes a hollow body, wherein the first clamp is arranged to grip the first weld component by at least a portion of an outer surface of the body, and wherein the damper is arranged in the hollow body of the first weld component in fitting engagement with at least a portion of an inner surface of the body.

4. The friction welding tool according to claim 3, wherein the dimensions of the damper (24) are variable to allow modification of the fitting engagement of the damper with the at least a portion of the inner surface.

5. The friction welding tool according to claim 3, wherein the damper includes a damper body and an outer sheath for engagement with the at least a portion of the inner surface of the first weld component.

6. The friction welding tool according to claim 5, wherein the damper body is formed of a plastic, and/or the sheath is formed of rubber.

7. The friction welding tool according to claim 3, wherein the first clamp and the vibration damper are configured to cooperate to grip radially therebetween the first weld component.

8. The friction welding tool according to claim 1, wherein the anchor element is attached to the main body and to the damper by respective attachment means, wherein at least one of the attachment means is adjustable to vary the tension in the anchor element.

9. The friction welding tool according to claim 1, wherein the anchor element is detachably attached to the damper.

10. The friction welding tool according to claim 1, wherein the anchor element is formed of metal.

11. The friction welding tool according to claim 1, wherein the second clamp is rotatable relative to the first clamp.

12. The friction welding tool according to claim 1, further comprising a further damper arranged to absorb vibrations of the second weld component during the friction welding; and a further anchor element is arranged to couple the further damper to the main body of the friction welding tool to transfer the absorbed vibrations to the main body.

13. The friction welding tool according to claim 12, wherein the main body includes a rotatable spindle for rotating the second clamp, and the further anchor couples the further damper to the spindle.

14. The friction welding tool according to claim 1, wherein the friction welding tool is an inertia welding tool.

* * * * *